United States Patent
Valerio

(10) Patent No.: US 11,967,813 B2
(45) Date of Patent: Apr. 23, 2024

(54) U-SHAPED PULL BOX

(71) Applicant: EATON INTELLIGENT POWER LIMITED, Dublin (IE)

(72) Inventor: Elías Martínez Valerio, Nezahualcóyotl (MX)

(73) Assignee: EATON INTELLIGENT POWER LIMITED, Dublin (IE)

(*) Notice: Subject to any disclaimer, the term of this patent is extended or adjusted under 35 U.S.C. 154(b) by 204 days.

(21) Appl. No.: 17/550,412

(22) Filed: Dec. 14, 2021

(65) Prior Publication Data

US 2022/0190571 A1    Jun. 16, 2022

Related U.S. Application Data

(60) Provisional application No. 63/125,749, filed on Dec. 15, 2020.

(51) Int. Cl.
*H02G 3/08* (2006.01)
*H02G 3/14* (2006.01)
*H02G 3/18* (2006.01)

(52) U.S. Cl.
CPC .............. *H02G 3/081* (2013.01); *H02G 3/14* (2013.01); *H02G 3/18* (2013.01)

(58) Field of Classification Search
CPC ............. H02G 3/081; H02G 3/14; H02G 3/18
USPC ........................................................ 220/3.8
See application file for complete search history.

(56) References Cited

U.S. PATENT DOCUMENTS

| 8,867,235 | B2 | 10/2014 | Veillette | |
| 2005/0253124 | A1* | 11/2005 | Pyron | H02G 1/08 |
| | | | | 254/134.3 FT |
| 2009/0126988 | A1 | 5/2009 | Pyron | |
| 2009/0223958 | A1* | 9/2009 | Pyron | H02G 3/06 |
| | | | | 220/241 |
| 2016/0261098 | A1* | 9/2016 | Grant | H02G 3/081 |
| 2016/0352087 | A1* | 12/2016 | Wurms | H02G 3/081 |

FOREIGN PATENT DOCUMENTS

| CA | 3108598 | A1 * | 8/2021 | ........... H02G 3/0418 |
| CN | 101855732 | A  * | 10/2010 | ........... H01L 31/048 |
| CN | 202103381 | U  * | 1/2012 | ............. H02G 3/081 |

(Continued)

OTHER PUBLICATIONS

International Search Report and Written Opinion; Corresponding PCT Application No. PCT/EP2021/025495; Authorized Officer Nathalie Duperron; Mar. 25, 2022.

*Primary Examiner* — J. Gregory Pickett
*Assistant Examiner* — Niki M Eloshway
(74) *Attorney, Agent, or Firm* — Squire Patton Boggs (US) LLP

(57) ABSTRACT

A pull box for accepting cable in electrical wiring installations includes a main body. The main body includes a first leg, a second leg, and a bridge portion spanning between and interconnecting the first leg and the second leg. The first leg, the second leg, and the bridge portion form a U-shape and define an interior space. The pull box further includes a cover. The cover is movable relative to the housing to transition the pull box between an open state and a closed state. The cover permits access to the interior space when the pull box is in the open state and prevents access to interior space when the pull box is in the closed state.

20 Claims, 7 Drawing Sheets

(56) References Cited

FOREIGN PATENT DOCUMENTS

| EP | 2058867 | A2 | * | 5/2009 | ........... H01L 31/048 |
|----|---------|----|---|--------|-------------------------|
| GB | 2325502 |    |   | 11/1998 |                        |
| JP | H0311317 | U | * | 2/1991 |                         |
| JP | 3172959 | U | * | 1/2012 |                          |

* cited by examiner

U-SHAPED PULL BOX

CROSS REFERENCE TO RELATED APPLICATION

This application claims the benefit of U.S. Provisional Patent Application No. 63/125,749, filed on Dec. 15, 2020, the disclosure of which is incorporated by reference herein in its entirety.

FIELD OF INVENTION

The present disclosure relates to electrical wiring installations. More particularly, the present disclosure relates to a pull box having a U-shape.

BACKGROUND

Pull boxes are known in the field of electrical wiring. A pull box may be provided in a wiring installation to facilitate the pulling of cables through a conduit. Additionally, pull boxes may be provided to act as a splice box, protect conductors in threaded rigid conduit, connect lengths of conduit, or to provide access to conductors for maintenance and future system changes. Known pull boxes may be provided in a square, rectangular, cylindrical, or L-shaped configuration.

In certain applications, it is necessary or desired to run cable along a U-shaped pathway. Pull boxes of the square, rectangular, or cylindrical configuration may satisfactorily provide or accommodate such U-shaped pathway. The use, however, of these pull box configurations in U-shaped wiring pathways may present drawbacks. For example, an oversize pull box may need to be used to accommodate the minimum bend radius mandated by electrical codes for U-shaped cable runs. The use of the oversized pull box may increase the costs of the wiring installation. Additionally, the oversize pull box occupies an unnecessarily large amount of space, which may be undesirable in compact installation environments.

While it is possible to construct a wiring enclosure that approximates a U-shape using multiple known fittings, this option is undesirable due to the high cost associated with using multiple fittings, as well as the large amount of time that is required to assemble the fittings.

SUMMARY OF THE INVENTION

In one embodiment, a pull box for accepting cable in electrical wiring installations includes a main body. The main body includes a first leg, a second leg, and a bridge portion spanning between and interconnecting the first leg and the second leg. The first leg, the second leg, and the bridge portion form a U-shape and define an interior space. The pull box further includes a cover. The cover is movable relative to the housing to transition the pull box between an open state and a closed state. The cover permits access to the interior space when the pull box is in the open state and prevents access to interior space when the pull box is in the closed state.

In another embodiment, a method of installing electrical wiring includes providing a U-shaped pull box having a first leg, a second leg, a bridge portion spanning between and interconnecting the first leg and the second leg, and a cover connected to the bridge portion. The method also includes providing a cable, and running the cable through the first leg and into the bridge portion. The method further includes opening the cover, redirecting the cable through the second leg, and closing the cover.

In yet another embodiment, a wire installation includes a U-shaped pull box having a first leg, a second leg, a bridge portion spanning between and interconnecting the first and the second leg, and a cover connected to the bridge portion. The bridge portion has an interior surface that is a continuously curved surface having a first radius of curvature. The cover is moveable between an opened position and a closed position. A cable runs through the first leg, the bridge portion, and the second leg. The cable is bent to the first radius of curvature.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
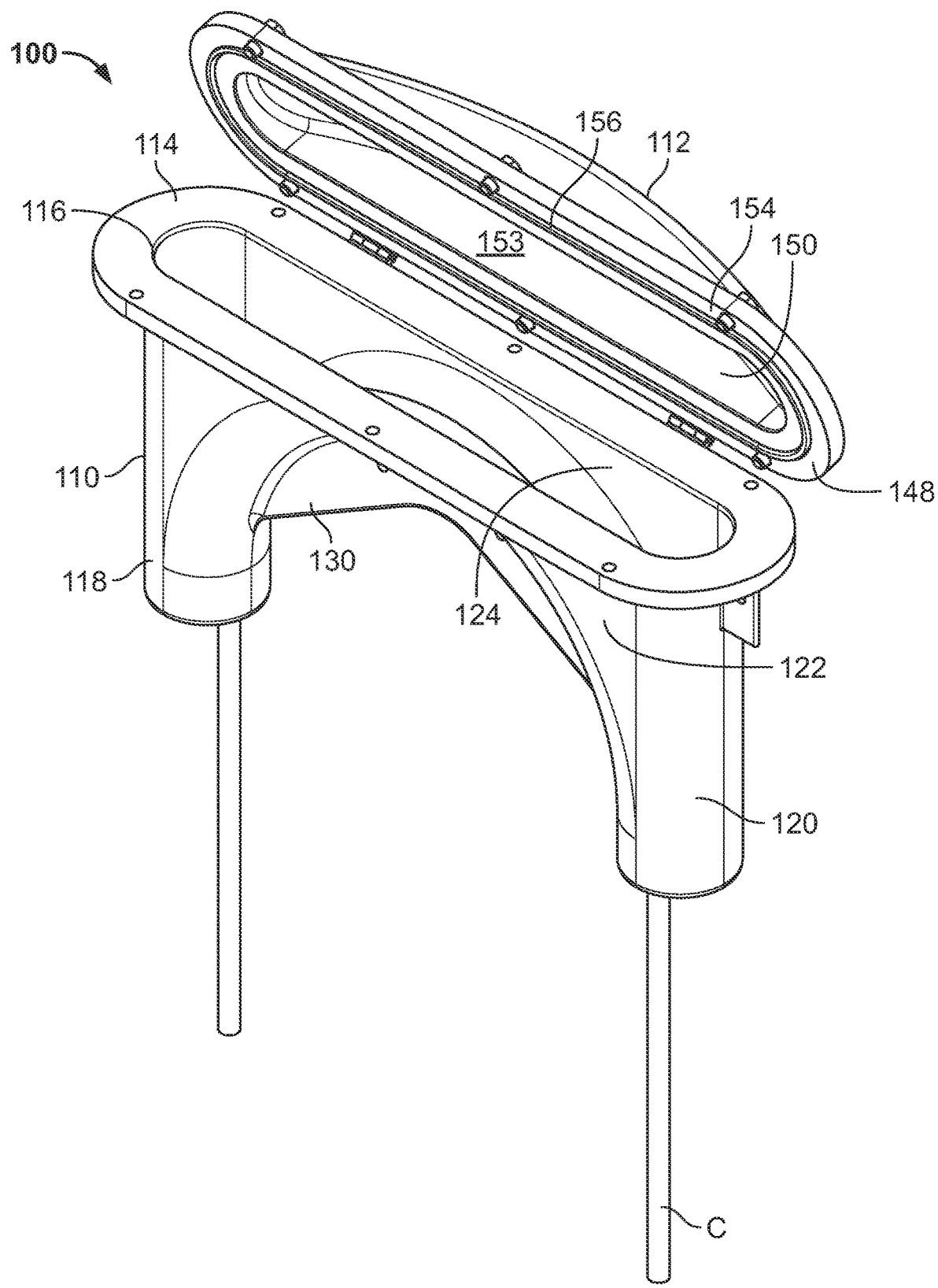
FIG. 1 is a perspective view of a pull box according to the present invention, the pull box being in an open state.

FIGS. 1-8 show an exemplary embodiment of a U-shaped pull box 100. The pull box 100 includes a first side 102 and a second side 104 that each extend between a first end 106 and a second end 108. The pull box 100 includes a main housing 110 and a cover 112. The main housing 110 and the cover 112 may be of any desired material including, without limitation, aluminum, coated PVC, feraloy, stainless steel, and copper.

The main housing 110 includes a flange 114. The flange 114 defines an opening 116. In the illustrated embodiment, the opening 116 is substantially stadium shaped. In alternative embodiments, the opening may be any desired shape. A first leg 118, a second leg 120, and a bridge portion 122 extend from the flange 114. The first leg 118 is provided at the first end 106 of the pull box 100. The second leg 120 is provided at the second end 108 of the pull box 100. The bridge portion 122 spans between and interconnects the first leg 118 and the second leg 120. The first leg 118, the bridge portion 122, and the second leg 120 cooperate to define an interior space 124. The opening 116 defined by the flange 114 provides access to the interior space 124.

The first leg 118 and the second leg 120 extend substantially parallel to one another and perpendicular relative to a longitudinal axis of the flange 114. The bridge portion 122 is substantially arcuate, and is convex relative to the flange 114. Thus, in the illustrated embodiment, the first leg 118, the second leg 120, and the bridge portion 122 form a U-shape. In alternative embodiments, the first leg, the second leg, and the bridge portion may form any desired shape.

The bridge portion 122 includes an interior surface 126 and an exterior surface 128. In the illustrated embodiment, the interior surface 126 is a continuously curved surface having a radius of curvature (R) that is greater than the minimum bend radius for cable (C) that is run through the pull box 100. In an alternative embodiment, the interior surface may have any desired radius of curvature. In another alternative embodiment, the interior surface may be composed of a plurality of straight segments that are arranged to approximate a desired radius of curvature.

A brace 130 is provided on the exterior surface 128 of the bridge portion 122. In the illustrated embodiment, the brace 130 is provided as a single, continuous, V-shaped rib that is located midway between the first side 102 and the second side 104 of the pull box 100, and extends between the first leg 118 and the second leg 120. In an alternative embodiment, the brace may be discontinuous (i.e., made of separate, discrete rib segments), or terminate prior to reaching the first leg or the second leg. In another alternative embodiment, the brace may be any desired shape. For example, the brace may be a U-shaped rib. In yet another alternative embodiment, the brace may be offset toward the first side or the second side of the pull box. In still yet another alternative embodiment, the bridge portion may be provided with multiple braces. In still yet even another alternative embodiment, the brace may be omitted.

The brace 130 includes a first aperture 132 and a second aperture 134. The first and second apertures 132, 134 may, for example, receive a fastener (not shown) for mounting the main housing 110 to a desired structure or may be used to mount a tag (not shown). The first and second apertures 132, 134 are provided on opposite sides of the peak of the V-shaped brace 130. In an alternative embodiment, the brace may include a fewer or greater number of apertures. In another alternative embodiment, the first and second apertures may be provided on any desired location of the brace. In yet another alternative embodiment, the apertures may be omitted.

The first leg 118 and the second leg 120 are provided with a first mounting tab 136 and a second mounting tab 138, respectively. The first mounting tab 136 and the second mounting tab 138 are provided on a side of the respective leg 118, 120 opposite to the side of the leg on which the brace 130 is provided. In other words, the first and second mounting tabs 136, 138 extend from the first and second legs 118, 120, respectively away from the brace 130. Each of the first mounting tab 136 and the second mounting tab 138 is provided with an aperture 140, 142 that may, for example, receive a fastener (not shown) for mounting the main housing 110 to a desired structure or be used to assemble a ground lug (not shown). In an alternative embodiment, the main housing may include a fewer or greater number of mounting tabs. In another alternative embodiment, the mounting tabs may be provided at any desired location on the main housing. In still yet other alternative embodiments, the apertures, or the first and second mounting tabs themselves, may be omitted.

A first inlet 140 is provided at an end of the first leg 118, and a second inlet 142 is provided at an end of the second leg 120. Each of the first inlet 140 and the second inlet 142 is in communication with the interior space 124. The first inlet 140 and the second inlet 142 are each provided with a connection mechanism 144, 146. The connection mechanism 144, 146 is provided to allow a conduit or any other desired external structure to be attached to the first inlet 140 or the second inlet 142. In one example embodiment, the connection mechanism 144, 146 is an internal national pipe thread. In alternative embodiments, the first inlet or the second inlet may be provided with any desired connection mechanism. Non-limiting examples of connection mechanisms including external national pipe thread, Millimetric threads, and compression fittings. In other alternative embodiments, the connection mechanism may be omitted.

The cover 112 includes a flange 148. The flange 148 defines an opening 150. In the illustrated embodiment the cover opening 150 is substantially the same as the main housing opening 116 (i.e., stadium shaped). In alternative embodiments, the flange opening may be any desired shape.

A raised portion 152 extends from the flange 148. The raised portion 152 defines an interior space 153. In the illustrated embodiment, the raised portion 152 is substantially arcuate shaped and arranged to be concave relative to the flange 148. In alternative embodiments, the raised portion may be any desired shape. In other alternative embodiments, the raised portion may be omitted and the entire cover may be substantially planar.

The cover flange 148 is provided with a groove 154 for receiving a gasket 156. In the illustrated embodiment, the groove 154 is substantially stadium shaped so as to mimic the shape of the cover opening 150. In alternative embodiments the groove may have any desired shape. In another alternative embodiment, the groove may be provided on the main housing flange rather than the cover flange. In yet another alternative embodiment, the groove may be omitted.

The pull box 100 includes first and second hinges 158, 160 for attaching the cover 112 to the main housing 110. The first and second hinges 158, 160 may be made out of any desired material including, without limitation, stainless steel, aluminum, and copper. The first hinge 158 is attached to the main housing flange 114 and the cover flange 148 on the first side 102 of the pull box 100 toward the first end 106. The second hinge 160 is attached to the main housing flange 114 and the cover flange 148 on the first side 102 of the pull box 100 and toward the second end 108. In an alternative embodiment, the pull box may include a fewer or greater number of hinges. In another alternative embodiment, the hinges may be provided at any desired location on the pull box. In another alternative embodiment, the hinges may be omitted.

Figure 2:
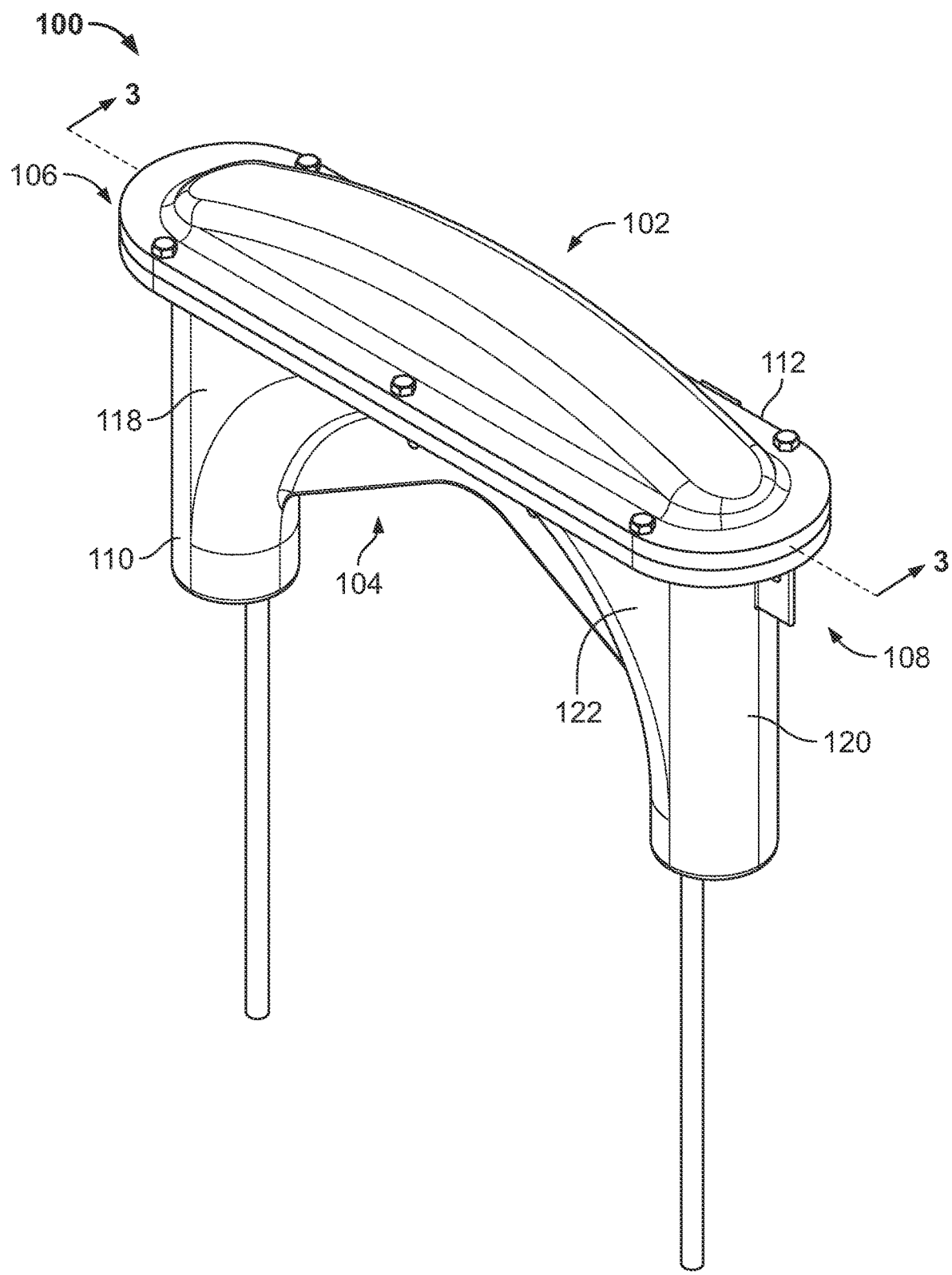
FIG. 2 is a perspective view of the pull box of FIG. 1, the pull box being in a closed state.
Figure 3:
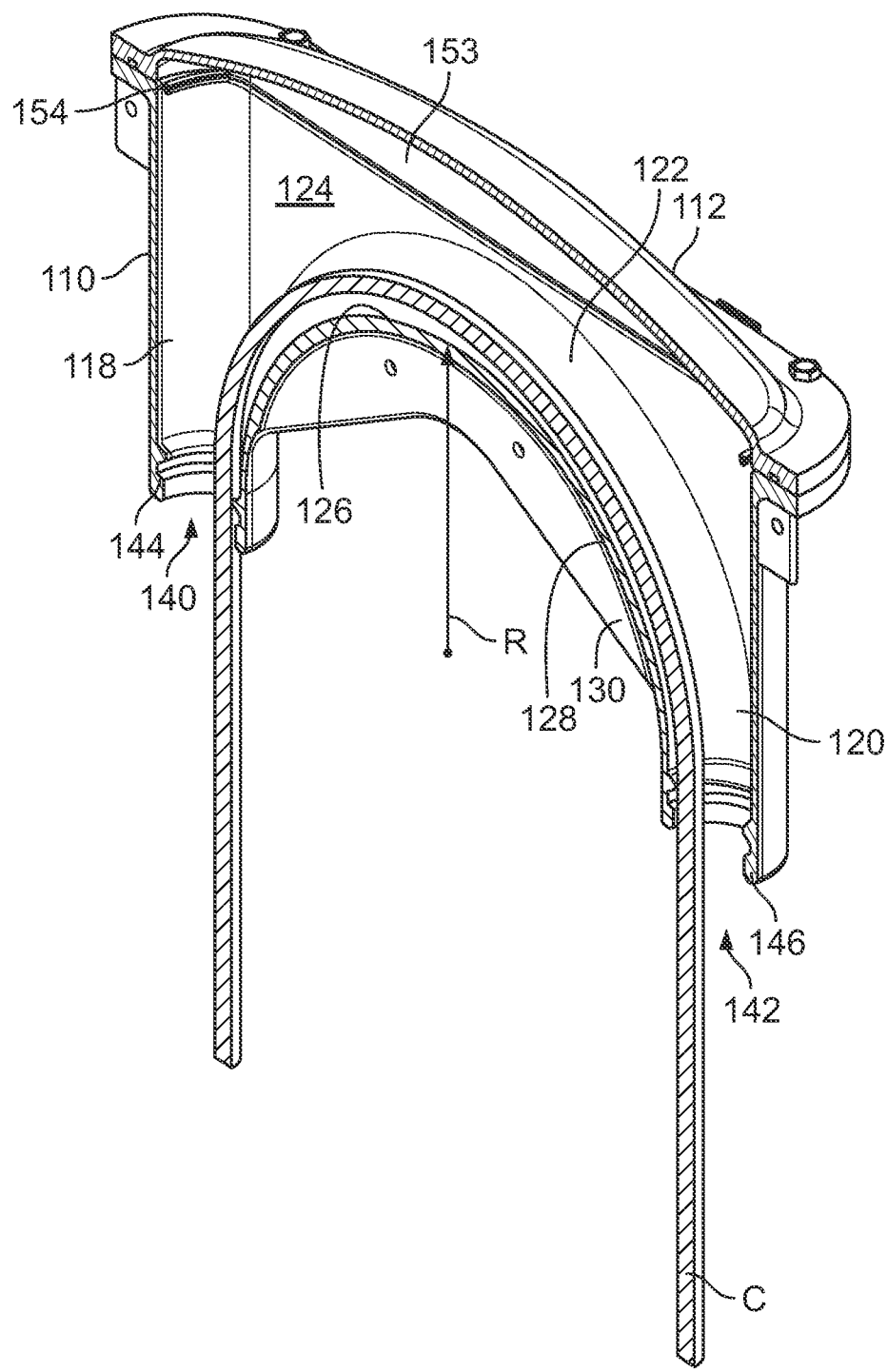
FIG. 3 is a sectional view along 3-3 of FIG. 2.
Figure 4:
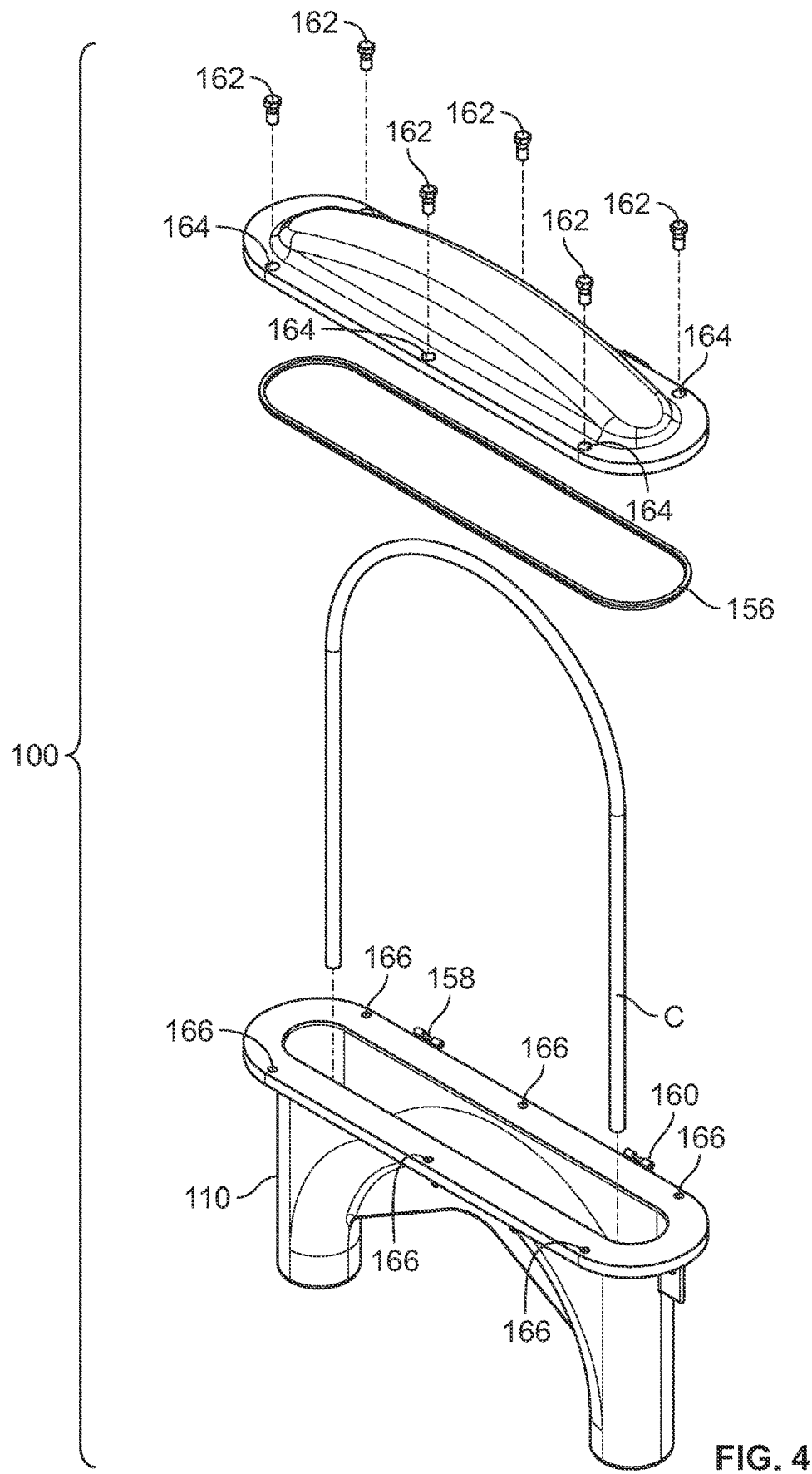
FIG. 4 is an exploded view of the pull box of FIG. 1.
Figure 5:
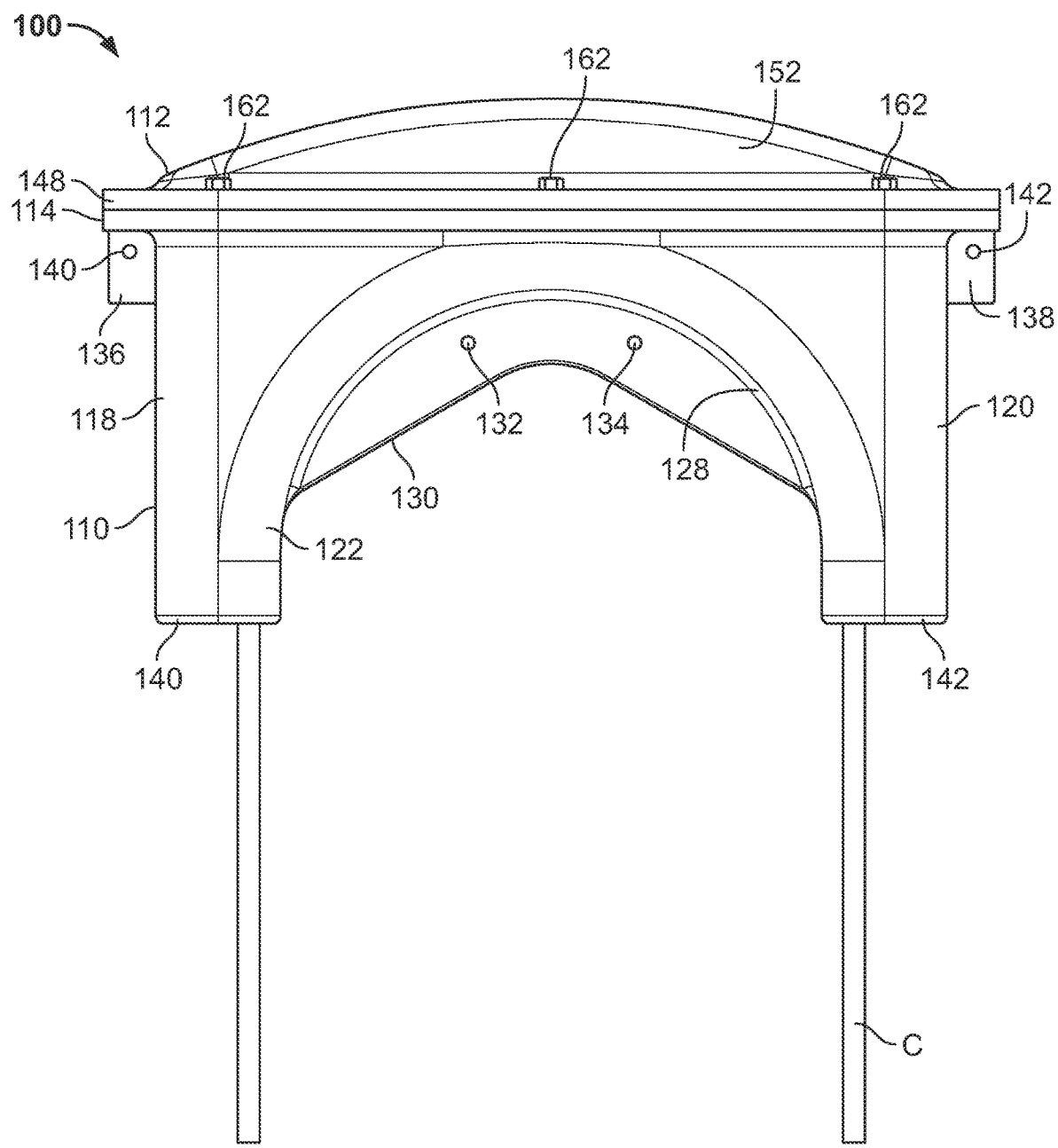
FIG. 5 is a side view of the pull box of FIG. 1.
Figure 6:
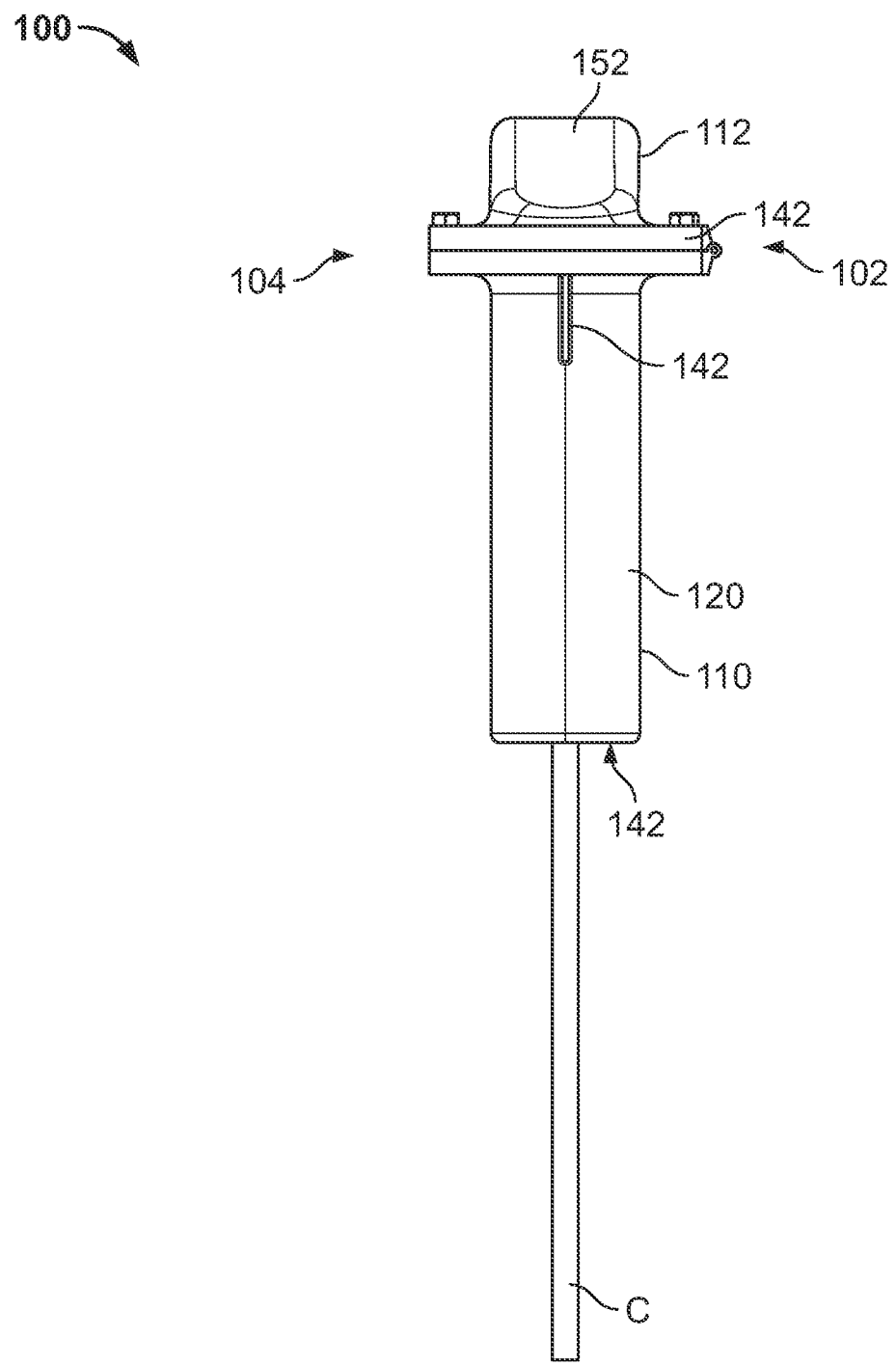
FIG. 6 is an end view of the pull box of FIG. 1.
Figure 7:
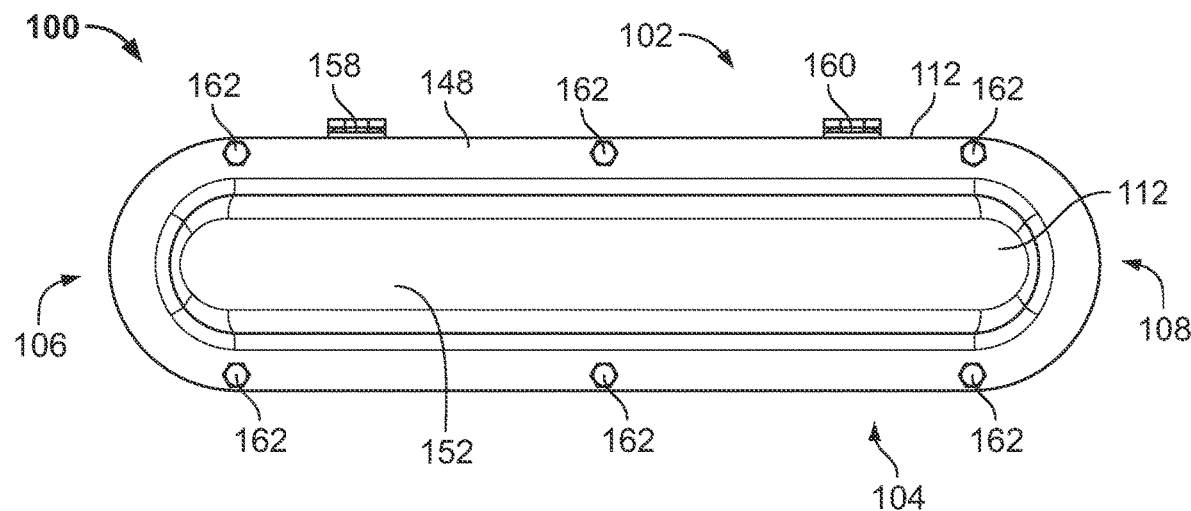
FIG. 7 is a top view of the pull box of FIG. 1.
Figure 8:
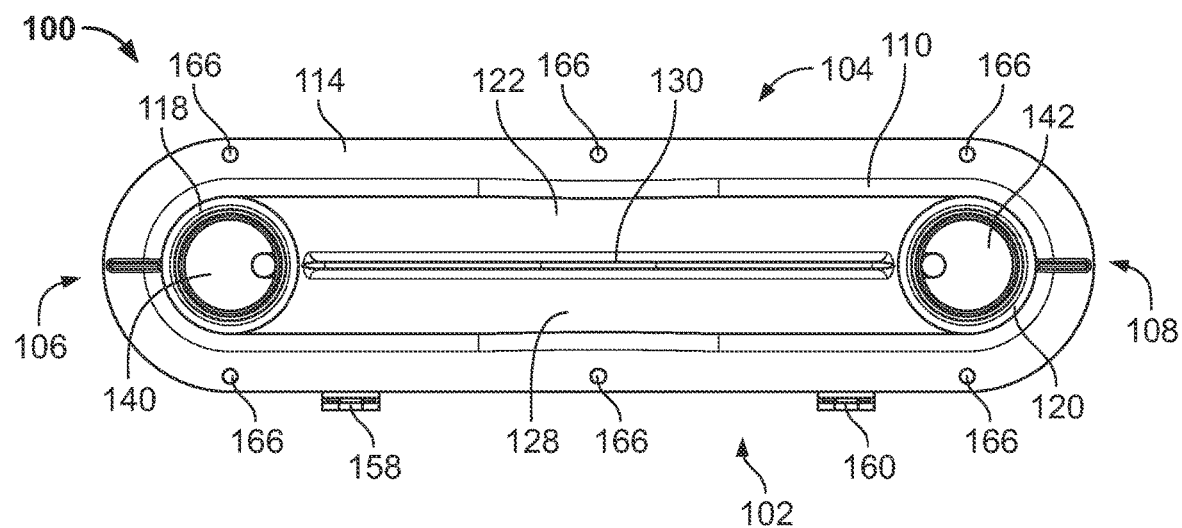
FIG. 8 is a bottom view of the pull box of FIG. 1.

The hinges 158, 160 permit the cover 112 to pivot relative to the main housing 110 to transition the pull box 100 between an open state (FIG. 1) and a closed state (FIG. 2). In the open state, the cover 112 does not obstruct the opening 116 of the main housing 110, thereby permitting access to the interior space 124 of the main housing 110. In the closed state, the cover 112 obstructs the opening 116 of the main housing 110, thereby preventing access to the interior space 124.

The cover 112 and the main housing 110 are arranged and configured such that, in the closed state, the combined volume of the interior space 153 of the cover 112 and the interior space 124 of the main housing 110 provide the pull box 100 with an interior volume that is at least the interior volume required by Pemex, UL, or NEC standards. Additionally, in the closed state, the cover flange 148 cooperates with the main housing flange 114 to define a flame path. The 156, which is received in the groove 154 on the cover flange 148, engages with the main housing flange 114 to prevent foreign contaminants from entering the pull box 100.

The pull box 100 may be provided with a locking mechanism 162 to maintain the pull box in the closed state. In the illustrated embodiment, the locking mechanism 162 is provided as six bolts that extend through apertures 164 on the cover flange 148 and engage with internal threads provided in apertures 166 on the main housing flange 114. In alternative embodiments, the pull box may include a greater or fewer number of bolts, and the apertures for receiving the bolts may be provided at any desired location. In other alternative embodiments, the locking mechanism may be provided as any desired arrangement. For example, the locking mechanism may be provided as a clamp, or as an adhesive that is applied to the cover flange or the main housing flange. In yet another alternative embodiment, the locking mechanism may be omitted.

An exemplary method of using the pull box 100 will now be described. First, the pull box 100 is attached to a desired structure using fasteners that extend through the apertures 132, 134 on brace 130 and the apertures 140, 142 on first and second mounting tabs 136, 138. Next, a first conduit is attached to the first inlet 140 of the first leg 118 using the respective connection mechanism 144, and a second conduit is attached to the second inlet 142 of the second leg 120 using the respective connection mechanism 146. Then, a cable (C) is run through the first conduit, the first leg 118, and into the bridge portion 122.

With the pull box 100 in the open state, the cable may (C) be accessed through the opening 116 of the main housing 110, and redirected into the second leg 120 and through the second conduit. During this, the cable (C) may be manipulated so as to be forced into contact with the interior surface 126 of the bridge portion 122. Due to the specifically selected radius of curvature (R) for the interior surface 126, this contact prevents the cable (C) from being worked into a curve that is less than the minimum bend radius for that specific cable (C). The cover 112 may then be moved relative to the main housing 110 to transition the pull box 110 to the closed state. Finally, the locking mechanism 162 may be used to secure the cover 112 to the main housing 110 to maintain the pull box 110 in the closed state.

The foregoing method is merely exemplary. Any of the individual steps may be changed or omitted, and the order in which the steps are performed may be changed. For example, the first and second conduit may be attached to the first inlet or the second inlet before the main housing is attached to a desired structure. As another example, the step of attaching the first conduit or the second conduit may be omitted. As yet another example, the cover may be moved to the closed position before the cable is run through the pull box, and the redirecting of the cable may occur through contact with the raised portion of the cover.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A pull box for accepting cable in electrical wiring installations, the pull box comprising:
    a main body comprising:
        a first leg;
        a first inlet at an end of the first leg;
        a second leg;
        a second inlet at an end of the second leg;
        a bridge portion spanning between and interconnecting the first leg and the second leg;
        wherein the first leg, the second leg, and the bridge portion form a U-shape and define an interior space; and
        an opening that provides access to the interior space; and
    a cover, the cover being movable relative to the housing to transition the pull box between an open state and a closed state, the cover permitting access to the interior space when the pull box is in the open state and preventing access to interior space when the pull box is in the closed state;
    wherein the first and second inlets face in a same first direction and the opening faces in a second direction, the first direction being opposite the second direction.

2. The pull box of claim 1, wherein the bridge portion has an interior surface, the interior surface having a radius of curvature that is greater than a minimum bend radius for the cable that is accepted by the pull box.

3. The pull box of claim 2 further comprising a brace provided on an exterior surface of the bridge portion, the brace extending between the first leg and the second leg.

4. The pull box of claim 1 further comprising a first mounting tab on the first leg and a second mounting tab on the second leg, each of the first mounting tab and the second mounting tab having an aperture.

5. The pull box of claim 1, wherein the main body has a first flange and the cover has a second flange, the first flange and the second flange cooperating when the pull box is in the closed state to define a flame path.

6. The pull box of claim 5, wherein one of the first flange and the second flange has a groove that receives a gasket.

7. The pull box of claim 1, wherein the first leg and the second leg are each provided with a connection mechanism for attaching conduit to the main body.

8. The pull box of claim 7, wherein the connection mechanism is internal national pipe thread.

9. The pull box of claim 1 further comprising hinges that attach the cover to the main housing.

10. A method of installing electrical wiring, the method comprising:
    providing a U-shaped pull box having a first leg, a first inlet at an end of the first leg, a second leg, a second inlet at an end of the second leg, a bridge portion spanning between and interconnecting the first leg and the second leg, the first leg, the second leg, and the bridge portion defining an interior space, an opening that provides access to the interior space, and a cover connected to the bridge portion, wherein the first and second inlets face in a same first direction and the opening faces in a second direction, the first direction being opposite the second direction;

providing a cable;

running the cable through the first leg and into the bridge portion;

opening the cover;

redirecting the cable through the second leg; and closing the cover.

11. The method of claim 10, wherein the cover is hingedly connected to the bridge portion.

12. The method of claim 10, wherein the closing of the cover includes sealing the cover to the bridge portion.

13. The method of claim 12, wherein the sealing of the cover to the bridge portion includes sealing the cover to the bridge portion with a gasket.

14. The method of claim 10, wherein the bridge portion has an interior surface that is a continuously curved surface having a first radius of curvature.

15. The method of claim 14, wherein the redirecting of the cable through the second leg includes bending the cable to the first radius of curvature.

16. A wire installation comprising:
a U-shaped pull box having a first leg, a second leg extending substantially parallel to the first leg, a bridge portion spanning between and interconnecting the first leg and the second leg, and a cover connected to the bridge portion,
  wherein the bridge portion has an interior surface that is a continuously curved surface having a first radius of curvature, and
  wherein the cover is moveable between an opened position and a closed position;
a cable running through the first leg, the bridge portion, and the second leg, wherein the cable is bent to the first radius of curvature.

17. The wire installation of claim 16, wherein the cover is hingedly connected to the bridge portion.

18. The wire installation of claim 16, wherein the first radius of curvature is greater than a minimum bend radius for the cable.

19. The wire installation of claim 16, further comprising a gasket disposed between the bridge portion and the cover.

20. The wire installation of claim 16, wherein the bridge portion has a first flange and the cover has a second flange.

* * * * *